United States Patent
Romero Lobato

(10) Patent No.: US 7,362,558 B2
(45) Date of Patent: Apr. 22, 2008

(54) PROTECTIVE DEVICE IN A CONTROLLER

(75) Inventor: Antonio Romero Lobato, Schaafheim (DE)

(73) Assignee: Siemens Aktiengesellschaft, Munich (DE)

( * ) Notice: Subject to any disclaimer, the term of this patent is extended or adjusted under 35 U.S.C. 154(b) by 152 days.

(21) Appl. No.: 11/187,242

(22) Filed: Jul. 22, 2005

(65) Prior Publication Data

US 2006/0022527 A1 Feb. 2, 2006

(30) Foreign Application Priority Data

Jul. 28, 2004 (DE) ............ 10 2004 036 490

(51) Int. Cl.
*H02H 9/08* (2006.01)
*H02H 9/02* (2006.01)
*H02H 7/26* (2006.01)

(52) U.S. Cl. ............ 361/115; 361/42; 361/86; 361/87; 361/100

(58) Field of Classification Search .......... 361/93.1, 361/42, 115, 86, 87, 100
See application file for complete search history.

(56) References Cited

U.S. PATENT DOCUMENTS 4,644,253 A * 2/1987 Libert ............ 323/275
4,969,062 A 11/1990 Barylak et al.
7,142,004 B2 * 11/2006 Calrson ............ 326/14

* cited by examiner

*Primary Examiner*—Michael Sherry
*Assistant Examiner*—Zeev Kitov
(74) *Attorney, Agent, or Firm*—Laurence A. Greenberg; Werner H. Stemer; Ralph E. Locher

(57) ABSTRACT

In the case of a protective device in a controller which contains at least one processor and is connected to a sensor via a sensor ground line and at least one further line, the invention provides that a ground in the controller is connected to the sensor ground line via a semiconductor switch which disconnects or connects the ground and the sensor ground line as a function of whether the current through the sensor ground line and/or the voltage between ground and the sensor ground line are/is in each case greater or less than a predetermined value, and that the voltage which is applied to ground or is applied to the sensor ground line can be applied to an internal ground, which is used for measurement purposes, controlled by the processor with the aid of two further semiconductor switches.

6 Claims, 2 Drawing Sheets

US 7,362,558 B2

PROTECTIVE DEVICE IN A CONTROLLER

CLAIM FOR PRIORITY

This application claims the benefit of priority to German Application No. 10 2004 036 490.7 which was filed in the German language on Jul. 28, 2004, the contents of which are hereby incorporated by reference.

TECHNICAL FIELD OF THE INVENTION

The invention relates to a protective device in a controller, and in particular which includes at least one processor and is connected to a sensor via a sensor ground line and at least one further line.

BACKGROUND OF THE INVENTION

Particularly in motor vehicles, controllers are frequently connected to external components, for example sensors. In this case, a reliable ground connection is required between the circuits in the controller and those in the component. The supply network ground including the conductive parts of the motor vehicle is not suitable for this purpose, owing to the high currents that are present there, and the corresponding interference voltages. Sensor ground lines between controllers and external components are, however, subject to the risk that error voltages, for example in the form of the battery voltage, can be applied to the sensor ground line during installation and removal of the components, or during maintenance and repair work. The protective device according to the invention is intended to provide protection against a hazard such as this to the sensor ground line and to the conductors connected to it in the controller or in the component.

SUMMARY OF THE INVENTION

According to one embodiment of the invention, a ground in the controller is connected to the sensor ground line via a semiconductor switch which disconnects or connects the ground and the sensor ground line as a function of whether the current through the sensor ground line and/or the voltage between ground and the sensor ground line are/is in each case greater or less than a predetermined value, and in that the voltage which is applied to ground or is applied to the sensor ground line can be applied to an internal ground, which is used for measurement purposes, controlled by the processor with the aid of two further semiconductor switches.

In comparison to thermal or electronic protection devices, the protective device according to the invention has the advantage that, following a short, which may possibly result only in a short disturbance pulse, connection between the sensor ground line and ground need not be remade by suitable manipulation. In this case, a measurement—possibly with poor accuracy—may be possible when the semiconductor switch is switched off, depending on the voltage difference between the sensor ground line and ground.

In some cases, it is necessary to measure the absolute value of the voltage supplied to the controller from the sensor, while in other cases a ratiometric measurement is required. The protective device according to the invention makes it possible to provide the correct reference ground potential.

However, in order to avoid measuring errors, for example in the evaluation of sensor signals, one advantageous embodiment provides for a flag to be produced for evaluation during the disconnected state.

A further advantageous embodiment comprises an error bit being set at the start of the disconnection, which is produced for the processor and can be reset by a processor reset process. This means that it is possible to delete data which has been derived from a sensor signal incompletely and thus incorrectly in the processor, even before the disconnection, and to check and to process this data once again once the error bit has been reset.

One requirement for controllers and their components for motor vehicles is protection against polarity reversal. The device according to the invention should thus allow disconnection between ground and the sensor ground line independently of the polarity of the disturbance voltage. One development of the invention therefore provides for the semiconductor switch to be formed by a field-effect transistor without a parasitic diode.

BRIEF DESCRIPTION OF THE DRAWINGS

The invention allows numerous embodiments, which will be described in the following text and is illustrated schematically in a number of figures in the drawing, in which.

DETAILED DESCRIPTION OF THE INVENTION

Figure 1:
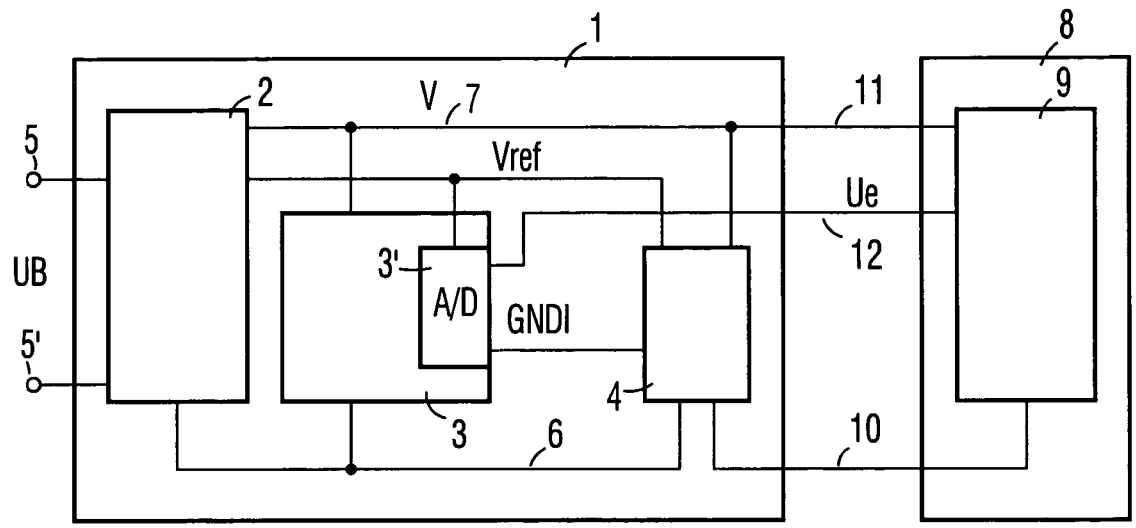
FIG. 1 shows a block diagram of a controller with a device according to the invention.

FIG. 1 shows a controller 1 which contains a power supply unit 2, a microprocessor 3 and a device 4 according to the invention—referred to in the following text as a protective circuit. Other parts are not illustrated, since it is not necessary to explain them in order to understand the invention. Connections 5, 5' are supplied with the operating voltage UB. Furthermore, the controller 1 is connected to ground. A ground 6 furthermore connects the processor 3 and the power supply unit 2 in the same way as the line 7 for a stabilized operating voltage V. The power supply unit 2 also produces a reference voltage Vref for an analog/digital converter 3' that is integrated in the processor.

An external component 8 has a sensor 9 which is connected to the controller via a sensor ground line 10, a line 11 for the operating voltage and a line 12 for the output signal Ue to be measured from the sensor 9. Ue is supplied to the analog/digital converter.

Figure 2:
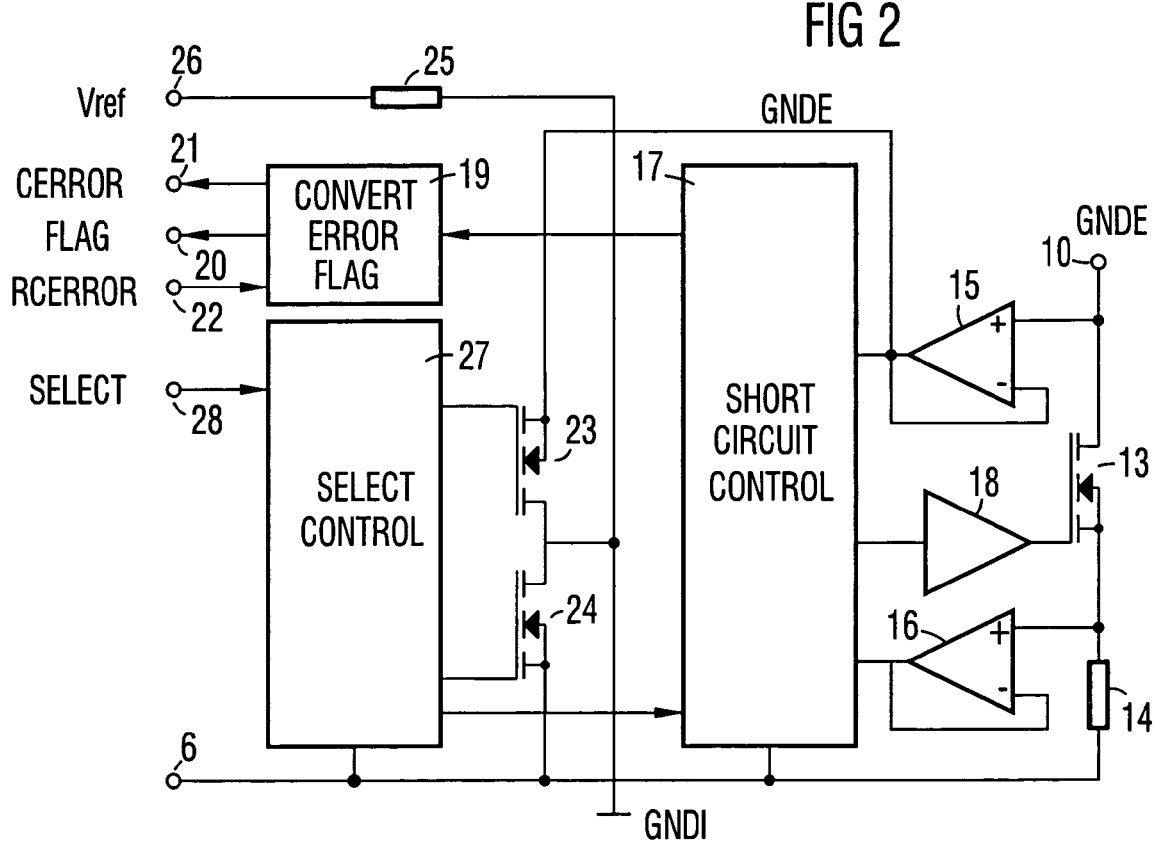
FIG. 2 shows a block diagram of a device according to the invention.

FIG. 2 shows the protective circuit 4 in the form of a block diagram, with the connecting points 6, 10 to ground and to the sensor ground line (FIG. 1) being annotated in the same way as those to the ground and to the sensor ground line. The ground and sensor ground line are connected to one another with the aid of a field-effect transistor 13. A current measurement resistor 14 is connected in series with the field-effect transistor 13. Two differential amplifiers 15, 16, which are connected as impedance converters, carrying the voltage across the current measurement resistor 14 as well as the voltage on the sensor ground line 10 to a short-circuit control circuit 17, which essentially contains threshold value circuits and results in the field-effect transistor 13 being switched off when at least one of the supplied voltages is greater than a respective threshold value. A driver 18 is located between the short-circuit control circuit 17 and the gate electrode of the field-effect transistor 13.

The short-circuit control circuit 17 also passes a signal to a device 19 which converts an error flag. This is passed via an input 20 to the processor 3 (FIG. 1) and assumes a predetermined state for as long as the field-effect transistor 13 is switched off. An error bit CERROR is produced at a further output 21 of the device 19 and assumes a predetermined value as soon as the field-effect transistor 13 is switched off, but does not reset itself again automatically. This does not occur until a reset signal RCERROR arrives at 22.

The internal ground GNDI, which is provided for measurement purposes, can be connected to one of the two voltages in the event of discrepancies between the voltage and the ground 6 and the voltage on the sensor ground line 10. Two field-effect transistors 23, 24 are provided for this purpose. A connecting point is connected to the internal ground GNDI and, via a resistor 25, to a reference voltage Vref (input 26), which is also used as the reference voltage for the analog/digital converter 31. The field-effect transistor 23 also has the voltage GNDE on the sensor ground line 10 applied to it, while the field-effect transistor 24 is connected to ground 6. The field-effect transistors 23, 24 can be switched on alternately via a control circuit 27, for which purpose a selection signal SELECT is supplied via an input 28. Furthermore, the selection signal SELECT can be used to switch the field-effect transistor 13.

Figure 3:
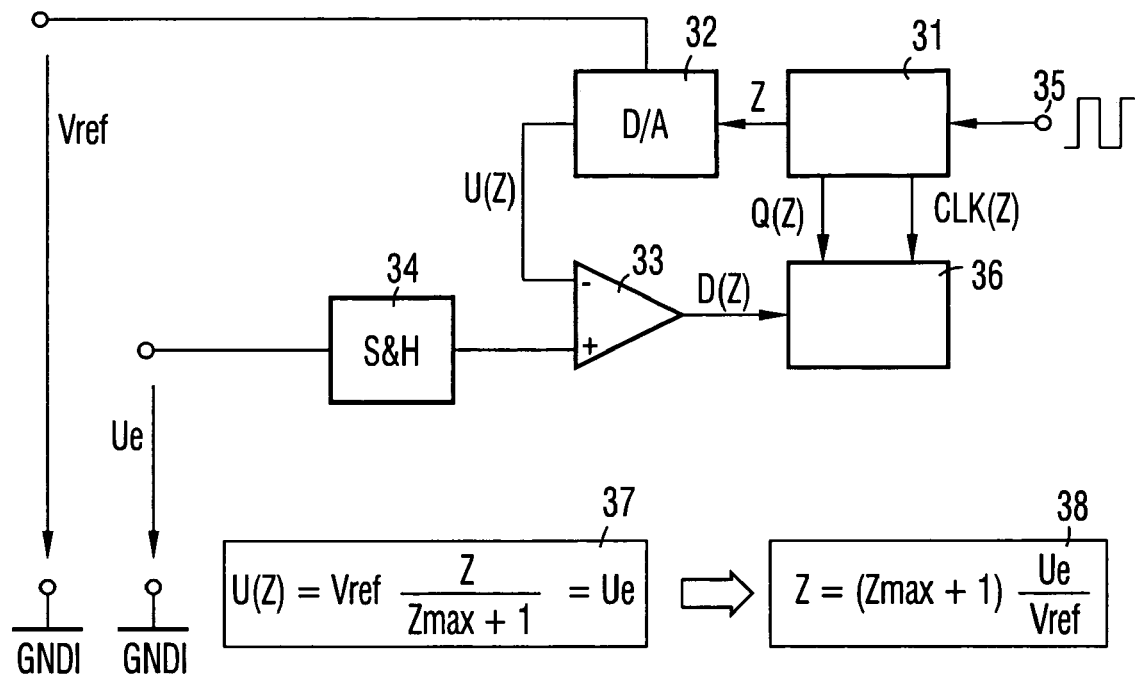
FIG. 3 shows a scheme for absolute value measurement.
Figure 4:
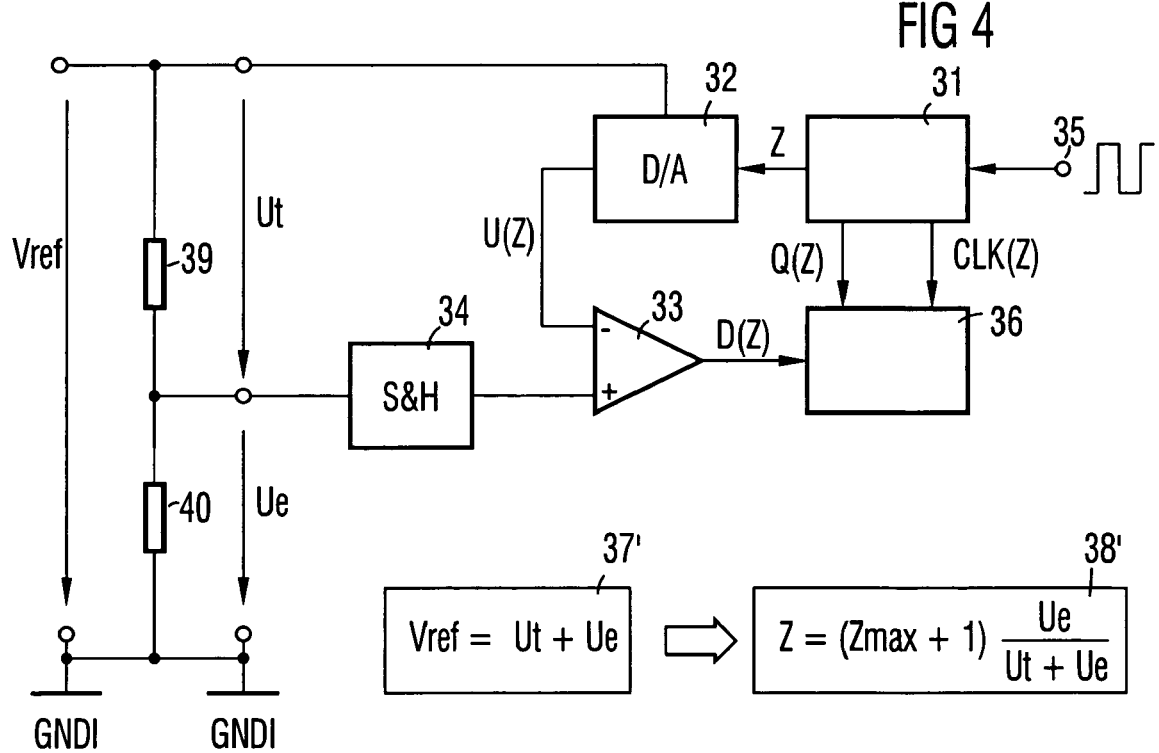
FIG. 4 shows a scheme for ratiometric measurement.

FIGS. 3 and 4 illustrate an absolute value measurement and a ratiometric measurement. In both cases, an analog/digital converter working on the basis of the follow-up method is used, which contains a follow-up register 31 whose respective count Z is supplied to a digital/analog converter 32. This produces a voltage U(Z), which corresponds to that component of the reference voltage Vref that is governed by the respective count Z. U(Z) is compared in a comparator 33 with the voltage Ue to be measured and which is supplied via a sample and hold circuit 34. The comparison result D(Z), the required clock ZLK(Z), which is supplied to an input 35, as well as a variable Q(Z) are stored in a conversion data register 36. The equation shown at 37 and 38 (FIG. 3) represents the conversion process, with the result Z being proportional to the ratio between the voltage Ue to be measured and the reference voltage Vref.

In the case of the ratiometric measurement shown in FIG. 4, the sample and hold circuit 34 is supplied with the voltage Ue to be measured as the output voltage from a voltage divider which comprises a sensor resistor 39 and a resistor 40 and to which the reference voltage Vref is applied. The result Z of the analog/digital conversion is then proportional to the quotient of Ue and Ut+Ue (equations 37' and 38').

The invention claimed is:

1. A controller, comprising:
   at least one processor;
   a first ground connected to the processor;
   a sensor ground line for connection to a sensor and at least one further line for connection to the sensor; and
   a protective circuit including a first semiconductor switch, at least two further semiconductor switches, and an internal ground provided for measurement purposes;
   the first semiconductor switch disconnecting or connecting the first ground and the sensor ground line dependent on at least one relationship selected from a group consisting of a relationship between a predetermined value and a current flowing through the sensor ground line and a relationship between a predetermined value and a voltage between the first ground and the sensor ground line;
   the two further semiconductor switches controlled by the processor in order to apply a selected voltage to the internal ground; and
   the selected voltage selected from a group consisting of a voltage applied to the first ground and a voltage applied to the sensor ground line.

2. The controller according to claim 1, wherein:
   during a state when the first semiconductor switch has disconnected the first ground and the sensor ground line, a flag is produced for evaluation.

3. The controller according to claim 1, wherein:
   an error bit for the processor is set when the first semiconductor switch begins to disconnect the first ground and the sensor ground line; and
   the processor performs a processor reset process to reset the error bit.

4. The controller according to claim 1, wherein the first semiconductor switch is formed by a field-effect transistor without a parasitic diode.

5. The controller according to claim 1, wherein:
   during a state when the first semiconductor switch has disconnected the first ground and the sensor ground line, the protective circuit produces a flag for evaluation.

6. The controller according to claim 1, wherein:
   the protective circuit causes an error bit to be set when the first semiconductor switch begins to disconnect the first ground and the sensor ground line; and
   the processor performs a processor reset process to reset the error bit.

* * * * *